(12) United States Patent
Ichikawa et al.

(10) Patent No.: US 8,175,606 B2
(45) Date of Patent: May 8, 2012

(54) WIRELESS COMMUNICATION SYSTEM AND SOFT HANDOFF CONTROL METHOD IN WIRELESS COMMUNICATION SYSTEM

(75) Inventors: Kiyoshi Ichikawa, Yokohama (JP); Michihiro Asanuma, Chigasaki (JP); Kiyotaka Kataoka, Chigasaki (JP)

(73) Assignee: Hitachi, Ltd., Tokyo (JP)

( * ) Notice: Subject to any disclaimer, the term of this patent is extended or adjusted under 35 U.S.C. 154(b) by 526 days.

(21) Appl. No.: 12/336,200

(22) Filed: Dec. 16, 2008

(65) Prior Publication Data
US 2009/0191879 A1    Jul. 30, 2009

(30) Foreign Application Priority Data
Jan. 21, 2008    (JP) .................................. 2008-009986

(51) Int. Cl.
*H04W 36/00*    (2009.01)
(52) U.S. Cl. ...................... 455/442; 455/439; 455/161.3
(58) Field of Classification Search .................. 455/436, 455/437, 438, 439, 442, 161.3; 370/332
See application file for complete search history.

(56) References Cited

U.S. PATENT DOCUMENTS

| | | | |
|---|---|---|---|
| 5,455,963 A | | 10/1995 | Shiotsuki et al. |
| 6,038,448 A * | | 3/2000 | Chheda et al. .................. 455/436 |
| 6,055,428 A * | | 4/2000 | Soliman .......................... 455/437 |
| 6,321,089 B1 * | | 11/2001 | Han ................................. 455/438 |
| 6,337,984 B1 * | | 1/2002 | Hong et al. .................... 455/439 |
| 6,418,320 B2 | | 7/2002 | Yoshida et al. |
| 6,532,221 B1 * | | 3/2003 | Kim et al. ....................... 370/332 |
| 6,574,475 B1 * | | 6/2003 | Suzuki ............................ 455/442 |
| 6,594,243 B1 * | | 7/2003 | Huang et al. ................... 370/332 |
| 6,782,261 B1 * | | 8/2004 | Ahmed et al. ................. 455/436 |
| RE39,177 E * | | 7/2006 | Padovani et al. .............. 455/442 |
| 7,299,019 B1 * | | 11/2007 | Austin et al. ................ 455/161.3 |
| 2005/0096052 A1 * | | 5/2005 | Csapo et al. ................... 455/439 |

(Continued)

FOREIGN PATENT DOCUMENTS

JP    6-164477    6/1994

(Continued)

OTHER PUBLICATIONS

3GPP2 C.s0024-A, "cdma2000 High Rate Packet Data Air Interface Specification," Version 3.0, Chapter 8, p. 8-86 and p. 8-132, Sep. 2006.

(Continued)

*Primary Examiner* — Wayne Cai
*Assistant Examiner* — Thach Nguyen
(74) *Attorney, Agent, or Firm* — McDermott Will & Emery LLP (57) ABSTRACT

When measurement results of received radio wave intensities of wireless base stations, which demands a soft handoff, are received from a wireless terminal in a wireless communication system and when a base station controller attempts to acquire a traffic channel in a wireless base station, via which a wireless communication path will be added, in the state in which the channel resource usage rate of that wireless base station is over a threshold, a traffic channel may be acquired only if the ratio between the radio wave intensity of the wireless base stations establishing communication paths and the radio wave intensity of the wireless base station via which a communication path will be added is higher than a threshold or if the difference between the radio wave intensity of the wireless base stations and the radio wave intensity of the wireless base station smaller than a threshold.

12 Claims, 9 Drawing Sheets

U.S. PATENT DOCUMENTS

2007/0077928 A1* 4/2007 Kim et al. .................... 455/436
2007/0275722 A1* 11/2007 Thorson et al. ............... 455/436

FOREIGN PATENT DOCUMENTS

| | | |
|---|---|---|
| JP | 10-051836 | 2/1998 |
| JP | 11-122167 | 4/1999 |
| JP | 2001-054153 | 2/2001 |
| JP | 2004-193786 | 7/2004 |

OTHER PUBLICATIONS

Japanese Office Action issued in Japanese Patent Application No. 2008-009986, dated Oct. 18, 2011.

* cited by examiner

| AT IDENTIFIER | | AT100 |
|---|---|---|
| NUMBER OF ESTABLISHED WIRELESS COMMUNICATION PATHS | | 1 |
| COMMUNICATION PATH #1 | BS IDENTIFIER | 200-1 |
| | PilotPNPhase | 101 |
| | RADIO WAVE INTENSITY | 9 |
| | TRAFFIC CHANNEL IDENTIFIER | 75 |

FIG.8

| AT IDENTIFIER | | AT100 |
|---|---|---|
| NUMBER OF ESTABLISHED WIRELESS COMMUNICATION PATHS | | 2 |
| COMMUNICATION PATH #1 | BS IDENTIFIER | 200-1 |
| | PilotPNPhase | 101 |
| | RADIO WAVE INTENSITY | 7 |
| | TRAFFIC CHANNEL IDENTIFIER | 75 |
| COMMUNICATION PATH #2 | BS IDENTIFIER | 200-2 |
| | PilotPNPhase | 102 |
| | RADIO WAVE INTENSITY | 6 |
| | TRAFFIC CHANNEL IDENTIFIER | 91 |

FIG.9

| NUMBER OF BSs CONTROLLED BY THIS BSC | | 60 |
|---|---|---|
| BS#1 | BS IDENTIFIER | 200-1 |
| | PilotPNPhase | 101 |
| BS#2 | BS IDENTIFIER | 200-2 |
| | PilotPNPhase | 102 |
| ⋮ | ⋮ | ⋮ |
| BS#60 | BS IDENTIFIER | 200-60 |
| | PilotPNPhase | 160 |

FIG.10

| NUMBER OF NEIGHBORING BSs | | 20 |
|---|---|---|
| NEIGHBORING BS#1 | PilotPNPhase | 301 |
| | ADDRESS OF CONTROLLING BSC | 192.168.30.101 |
| NEIGHBORING BS#2 | PilotPNPhase | 302 |
| | ADDRESS OF CONTROLLING BSC | 192.168.30.101 |
| ⋮ | ⋮ | ⋮ |
| NEIGHBORING BS#20 | PilotPNPhase | 505 |
| | ADDRESS OF CONTROLLING BSC | 192.168.30.105 |

FIG.11

WIRELESS COMMUNICATION SYSTEM AND SOFT HANDOFF CONTROL METHOD IN WIRELESS COMMUNICATION SYSTEM

INCORPORATION BY REFERENCE

The present application claims priority from Japanese application JP 2008-009986 filed on Jan. 21, 2008, the content of which is hereby incorporated by reference into this application.

BACKGROUND OF THE INVENTION

The present invention relates to a wireless communication technology, and more particularly to a soft handoff control technology in the wireless communication technology.

In a wireless communication system, data communications via wireless terminals, such as mail sending and receiving, access to the Internet, and web browsing, are becoming more and more popular recently. A wireless communication system comprises wireless terminals that are mobile stations, wireless base stations (BS) that are fixed stations and communicate wirelessly with wireless terminals, a base station controller (BSC) that is connected to a plurality of wireless base stations for controlling them, and an external network such as a public network. The base station controller that receives data from an external network transfers the data to wireless base stations via narrowband wired communications using T1 lines (standard for digital leased line at the communication speed of 1.5 Mbps). A wireless base station that receives data transfers the data wirelessly to wireless terminals. Such data communications are carries out according to a standardized method such as the one described in "3GPP2 C.S0024-A cdma2000 High Rate Packet Data Air Interface Specification Version 3.0 Chapter 8" (p. 8-86 and P. 8-132).

A wireless terminal, which is a mobile station, is required to continue data communications while switching wireless base stations, with which the wireless terminal communicates, from one wireless base station to another as it moves around. This switching operation is called a handoff. One of handoff technologies is called a soft handoff.

A soft handoff refers to a control method that carries out a handoff with no momentary interrupt in the data communications. In a soft handoff, the wireless communication path via the target wireless base station is reserved before releasing the wireless communication path via the source wireless base station. And, after the base station controller switches the data-receiving wireless base station from one wireless base station to another, the wireless communication path via the source wireless base station is released and the communication with the target wireless base station is started.

In this case, the wireless communication path between the wireless terminal and the target wireless base station is reserved as follows. First, the wireless terminal that is moving while communicating with the source wireless base station detects that the intensity of the radio wave from the target wireless base station becomes strong enough to be measured. The wireless terminal reports the measurement result to the source wireless base station and the base station controller and, in response to this report, the base station controller reserves and acquires a traffic channel that is a wireless resource required for establishing a communication path between the target wireless base station and the wireless terminal. After successfully acquiring the traffic channel, the base station controller instructs the wireless terminal to add the communication path that uses the traffic channel.

When a wireless terminal moves toward the cell boundaries of a plurality of wireless base stations, the radio waves from a plurality of wireless base stations sometimes become strong enough to be received at the same time as the wireless terminal gets nearer to the cell boundaries. When the intensities of radio waves from a plurality of wireless base stations are measurable, the wireless terminal reports the measurement result on the a plurality of wireless base stations to the wireless base stations and the base station controller. As a result, the base station controller establishes communication paths via the a plurality of wireless base stations, one for each wireless base station on which the measurement result was reported, and creates a soft handoff state. In this specification, the soft handoff state refers to the state in which a wireless terminal has established communication paths via a plurality of wireless base stations.

According to the standard defined in 3GPP2 C.S0024-A cdma2000 High Rate Packet Data Air Interface Specification Version 3.0 Chapter 8 (p. 8-86 and P. 8-132), up to six communication paths (traffic channels) may be established at the same time in the soft handoff state.

SUMMARY OF THE INVENTION

As described above, a soft handoff is a technology that establishes a plurality of communication paths at the same time between a wireless terminal and a plurality of wireless base stations to prevent a momentary interrupt in data communications and to ensure reliable communication quality. Even if the radio wave status of one wireless base station gets rapidly worse when a plurality of communication paths via a plurality of wireless base stations are established at the same time at a soft handoff time, many wireless communication paths via other wireless base stations are still available. So, in many cases, using a wireless communication path of those wireless communication paths having better communication quality prevents a rapid degradation in the communication quality.

On the other hand, a soft handoff, if generated near cell boundaries, may result in allowing only one wireless terminal to consume the resources of up to six wireless channels at the same time. Not only in a location near cell boundaries but in an actual field, there are sometimes locations where radio waves are received from a plurality of wireless base stations due to the surrounding landforms or buildings.

Traffic channels consumed in the communication with a wireless terminal are limited resources whose usage status must be managed according to the number of available resources (channel capacity) on a wireless base station basis. When the number of wireless terminals in the range of a wireless base station exceeds the facilities design conditions or especially when a plurality of wireless terminals move to a specific location at a time, and, as a result, many wireless terminals are in the soft handoff status, the traffic channels are consumed rapidly with the result that the traffic channel resources will be exhausted. In such a status, the problem is that no traffic channel can be allocated to a new connection call or to a reconnection call from a wireless terminal that has been in the dormant state, meaning that the connection processing cannot be performed. Another problem is that, when a wireless terminal that has established a wireless communication path only with one base station moves to such a location, the call may be disconnected because there is no handoff target wireless base station.

It is not expedient that an established wireless communication paths are disconnected at the base station controller or a higher-level device after each terminal has established five or six communication paths and the traffic channel resources are becoming exhausted. This is because judging which channels should be released from a base station in such a status, with a minimum effect on the communication, requires the base station controller or a higher-level device to find the other base stations to which each wireless terminal, which uses a channel of that base station, is connected, to collect the values of the radio field intensities of all other connected base stations, and to evaluate the collected radio intensities. This processing is cumbersome and inefficient because it must be repeated until a channel satisfying the release criterion is found. Another problem with this processing is that it takes long because, even if a channel satisfying the release criterion is found, the next call cannot be connected until the channel release notification is sent to the wireless terminal and the release completion notification is returned form the wireless terminal.

In view of the foregoing, it is an object of the present invention to provide a soft handoff control method and a base station controller that allow more wireless terminals to use traffic channels efficiently while maintaining the merit of a soft handoff that ensures both data communication switching without momentary interrupts and reliable communication quality.

To solve the above problems, the present invention provides a wireless communication system comprising a plurality of base stations that wirelessly communicate with a plurality of wireless terminals; and a base station controller that controls the plurality of base stations wherein when a measurement value of a received radio wave intensity of a base station, which has not yet established a communication path with a wireless terminal in a soft handoff status, is received from the wireless terminal, the base station controller calculates a ratio between the received measurement value of the received radio wave intensity and a measurement value of a highest received radio wave intensity of base stations that have already established communication paths with the wireless terminal and, based on the calculated ratio and a traffic channel usage rate of the base station with which the wireless terminal has not yet established a communication path, judges if a communication path can be established between the wireless terminal and the base station.

The present invention provides a soft handoff control method and a base station controller that allow more wireless terminals to efficiently use traffic channels when traffic channels, which are wireless resources, become congested while still maintaining communication quality provided by a soft handoff. In addition, the present invention provides the wireless terminal user with services of uniform connection quality even when a sudden increase occurs in the wireless terminal traffic that was unexpected at the design time of the wireless base station facilities or even when traffic congestion is caused by the geographical radio wave environment.

That is, the present invention allows more wireless terminals, such as a wireless terminal that has moved from another area or a wireless terminal that sends a call connection request, to use traffic channels efficiently without degrading the communication quality of those wireless terminals that are performing communication, thus providing the wireless terminal user with services of uniform connection quality.

Other objects, features and advantages of the invention will become apparent from the following description of the embodiments of the invention taken in conjunction with the accompanying drawings.

DESCRIPTION OF THE EMBODIMENTS

Embodiments of the present invention will be described with reference to the drawings.

[First Embodiment]

Figure 1:
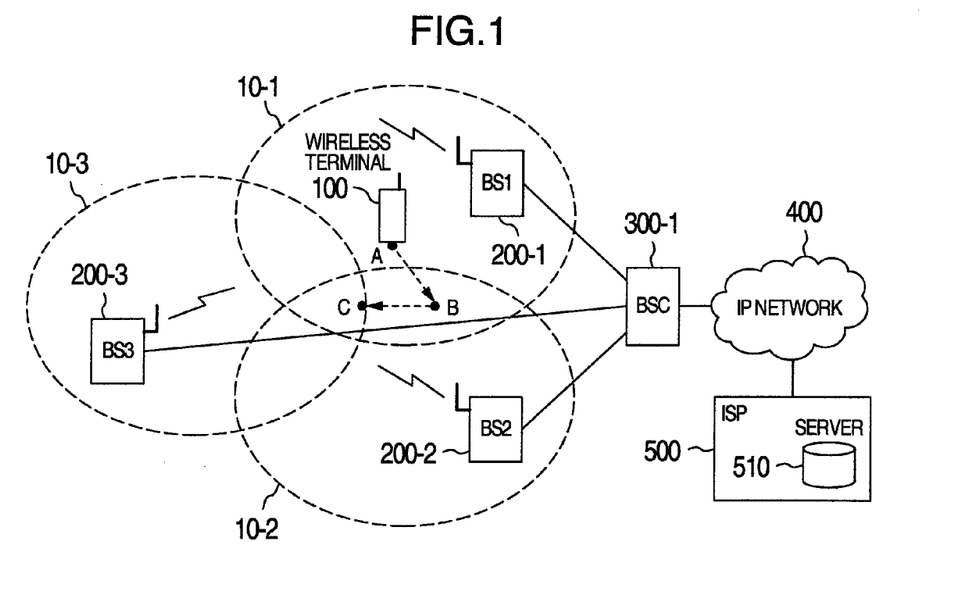
FIG. 1 is a diagram showing the configuration of a wireless communication system in one embodiment of the present invention.

FIG. 1 is a diagram showing an example of the configuration of a wireless communication system in one embodiment of the present invention.

The wireless communication system comprises wireless terminals 100, wireless base stations 200 (BS1, BS2, BS3) each of which is a wireless base station connecting the wireless terminal 100 and a wireless communication path, a base station controller 300 (BSC) that is a base station controller connecting a plurality of wireless base stations 200 and an IP network 400, and an Internet service provider 500 (ISP) that transfers application data via the IP network 400. The Internet service provider 500 has a server 510 in which data is accumulated.

A wireless base station (BS) is a fixed station, and the range in which the wireless base station can wirelessly communicate with wireless terminals is limited. In FIG. 1, the ranges in which wireless base stations 200-1 to 200-3 can communicate with wireless terminals are indicated by areas 10-1 to 10-3. Consider how wireless communication paths are reserved as the wireless terminal 100 moves around in those areas. The wireless terminal 100 at the location A in the area 10-1 first establishes a wireless communication path only with the wireless base station 200-1. When the wireless terminal 100 moves from the location A to the location B, the radio wave from the wireless base station 200-2 becomes strong enough to be measured. The wireless terminal 100 measures the intensity of the radio wave received from the wireless base station 200-2 and reports this intensity to a base station controller 300-1. In response to this report, the base station controller 300-1 reserves a wireless communication path via the wireless base station 200-2. As a result, the wireless terminal 100 enters the soft handoff state in which two wireless communication paths, the communication path via wireless base station 200-1 and the communication path via the wireless base station 200-2, are reserved.

In addition, when the wireless terminal 100 moves from the location B to the location C, the radio wave from the wireless base station 200-3 becomes strong enough to be measured. The wireless terminal 100 measures the intensity of the radio wave received from the wireless base station 200-3 and reports this intensity to the base station controller 300-1. In response to this report, the base station controller 300-1 reserves another wireless communication path via the wireless base station 200-3. As a result, the wireless terminal 100 is in the state in which wireless communication paths are established with three wireless base stations at the same time.

In the description below, the communication system shown in FIG. 1 is used as an example.

First, the base station controller will be described with reference to FIG. 2 and FIG. 3. First, the following describes the hardware configuration.

Figure 2:
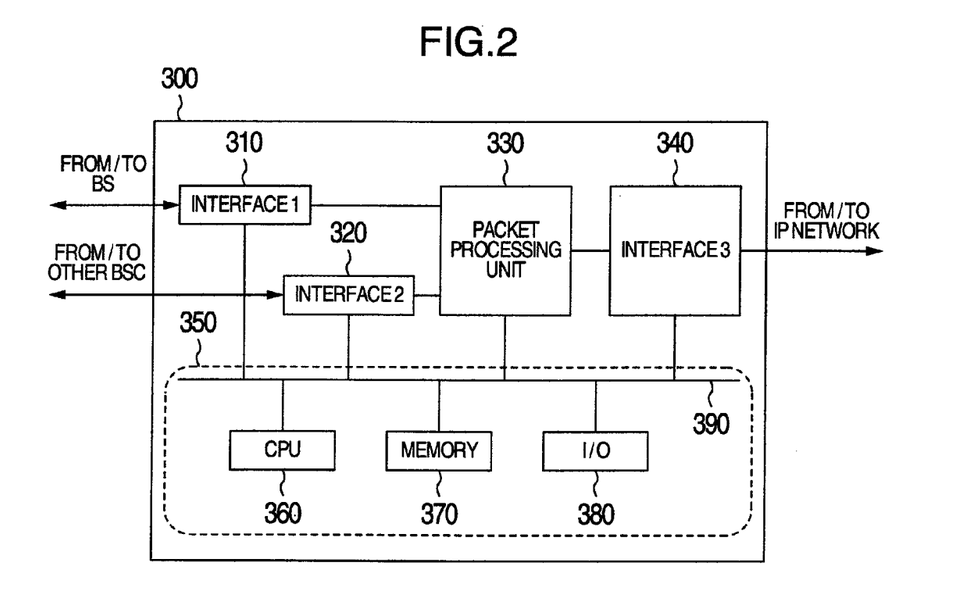
FIG. 2 is a diagram showing the hardware configuration of a base station controller in one embodiment of the present invention.

FIG. 2 is a diagram showing the hardware configuration of a base station controller in one embodiment of the present invention.

The base station controller 300 comprises an interface 310 with the wireless base stations 200, an interface 320 with other base station controllers, an interface 340 with an IP network such as the Internet, a packet processing unit 330 that performs the signal processing such as the switching of signals sent and received among those interfaces, and a control unit 350 that generally controls the base station controller 300.

The control unit 350 comprises a CPU 360 that is a processor controlling the general operation of the base station controller 300, a memory 370 in which various types of data required for the program operation is stored, and an I/O unit 380 that sends and receives signals to and from an external device. A control line 390 connects the blocks described above.

Next, the following describes the software configuration of the base station controller.

Figure 3:
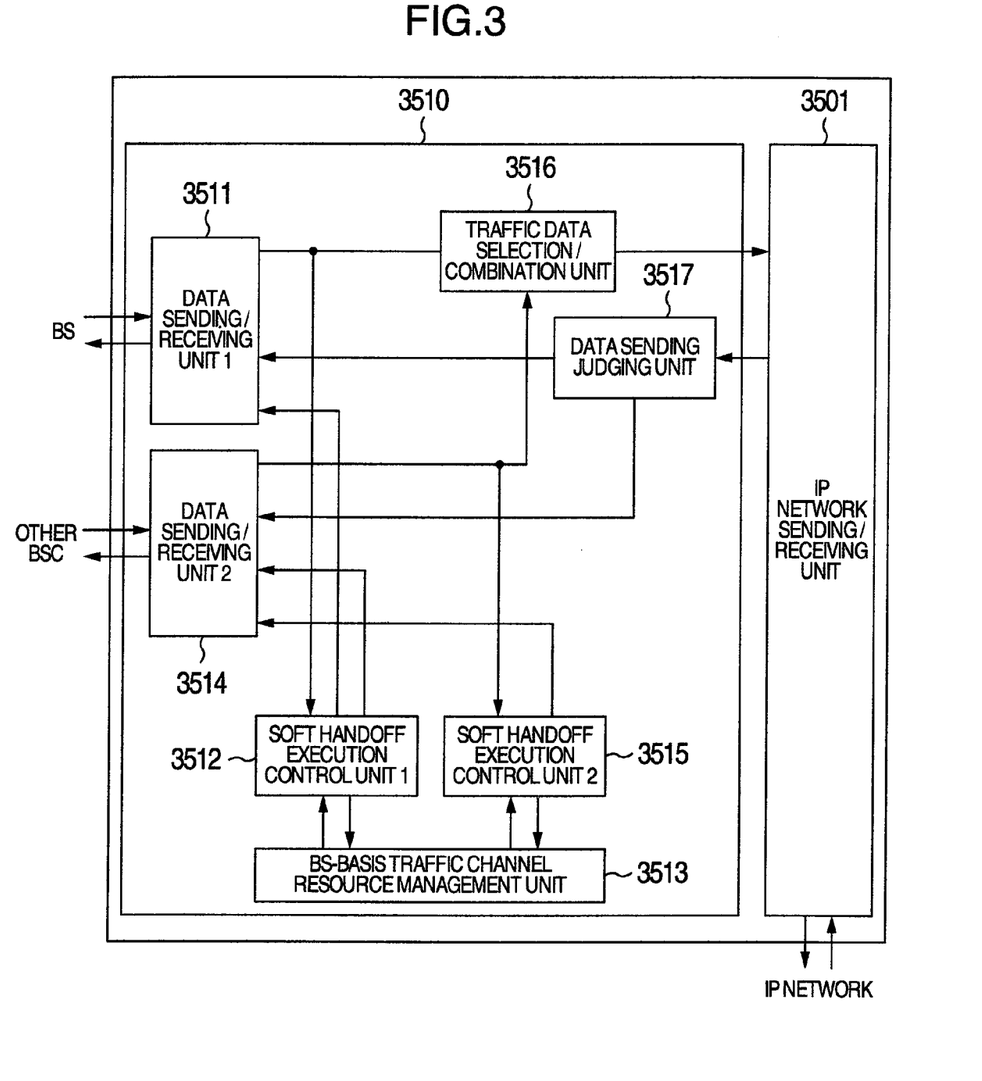
FIG. 3 is a diagram showing the software configuration of the base station controller in one embodiment of the present invention.

FIG. 3 is a functional configuration diagram showing an example of the software configuration of the base station controller 300.

The control unit 350 of the base station controller 300 includes a wireless session unit 3510 that carries out wireless session communications with a plurality of wireless base stations 200 via an IP network and an IP network sending/receiving unit 3501 that communicates with the IP network 400 via a wired line.

The wireless session unit 3510 comprises a data sending/receiving unit (1) 3511 that sends and receives data to and from the wireless base stations 200, a soft handoff execution control unit 3512 that acquires the report value of the received radio wave intensities of a plurality of wireless base stations, which is measured by a wireless terminal, from the data received by the data sending/receiving unit (1) 3511 and performs the soft handoff processing, a traffic channel resource management unit 3513 that manages the usage status of the channel resources of each controlled wireless base station, a data sending/receiving unit (2) 3514 that sends and receives data to and from another base station controller when a soft handoff to and from a neighboring base station controller occurs, a soft handoff execution control unit 3515 that processes a traffic channel acquisition request message received from a neighboring base station controller when the data received by the data sending/receiving unit (2) 3514 indicates that a wireless base station controlled by this base station controller is the handoff target, a traffic data selection/combination unit 3516 that, when traffic data from the same wireless terminal is received via a plurality of wireless base stations, selects the lowest-error-rate, best-quality data from the traffic data and sends the selected data to the IP network, and a data sending judging unit 3517 that acquires received data from the IP network sending/receiving unit and judges the target wireless base station. Although only one connection line is indicated from each of the data sending/receiving unit (1) 3511 and the data sending/receiving unit (2) 3514 in FIG. 3, the base station controller is connected to multiple base stations and multiple base station controllers for sending and receiving data.

Although the wireless session processing unit 3510 provided in the base station controller 300 shown in FIG. 2 and FIG. 3 is executed by the processor (CPU) included in the control unit and the software accumulated in the memory, a part of the function may be implemented by hardware. In the description below, it is assumed that the function blocks are driven by the CPU and the memory included in the control unit or by the hardware to perform the device operation such as the control of connection with wireless terminals and wireless base stations.

Figure 4:
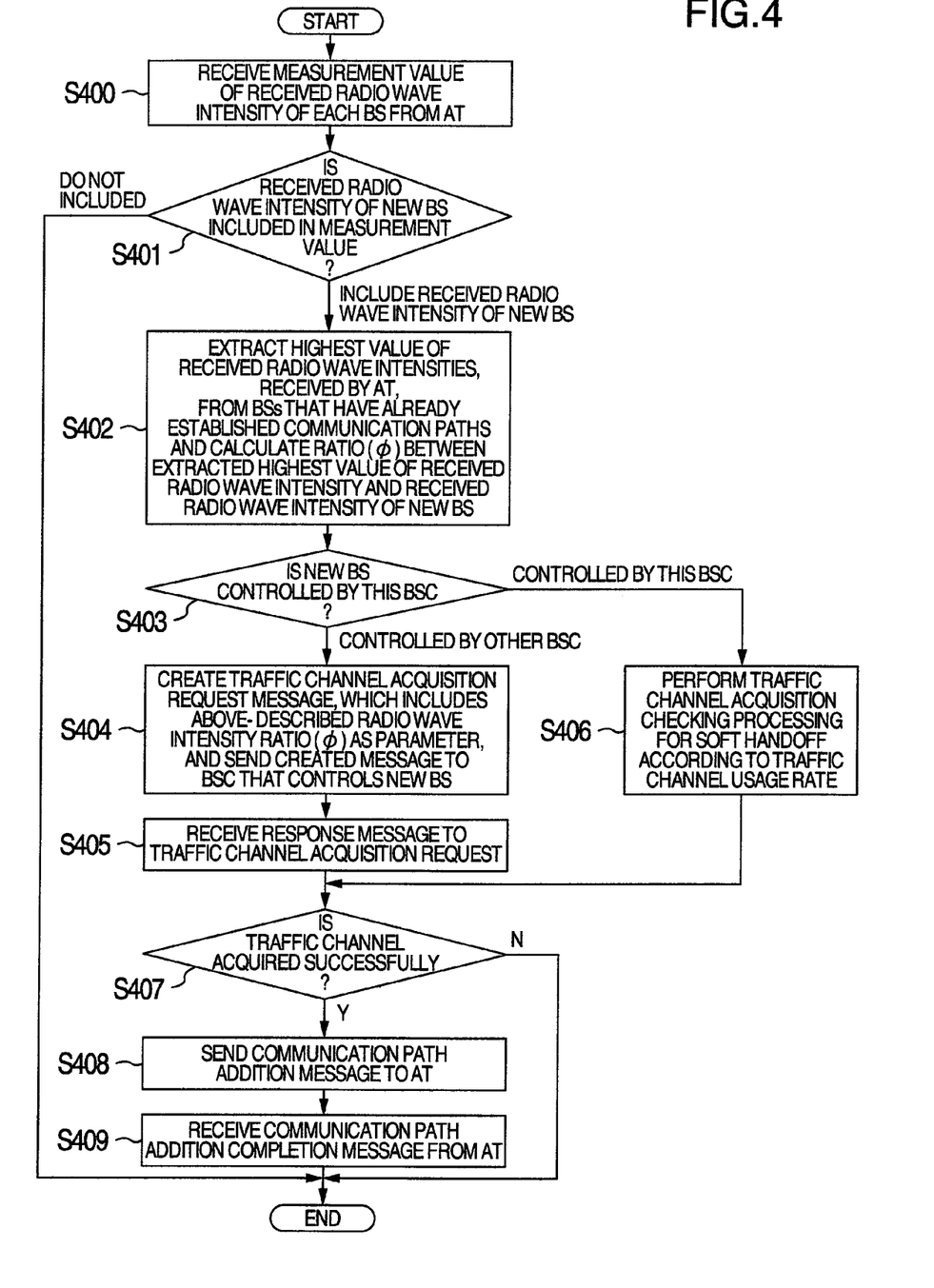
FIG. 4 is a flowchart showing the operation of the base station controller in one embodiment of the present invention.
Figure 6:
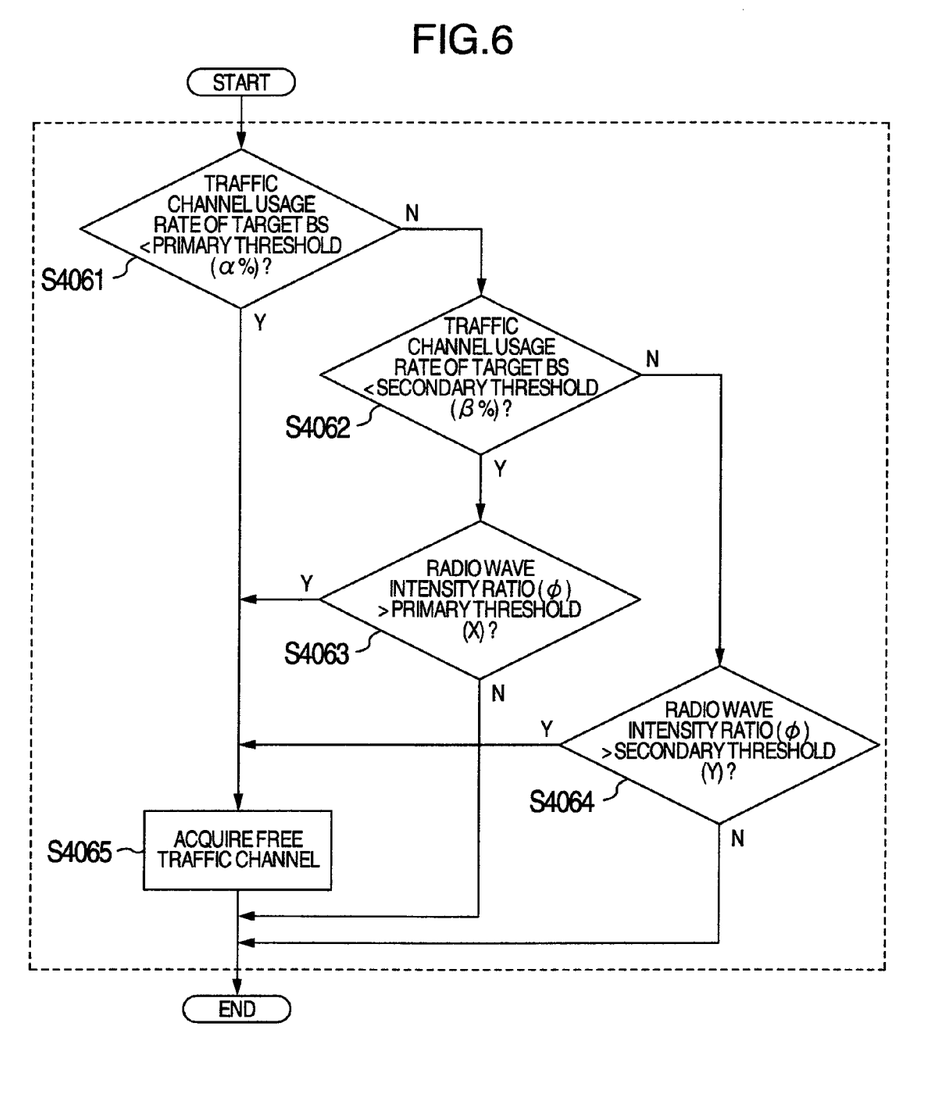
FIG. 6 is a flowchart showing the operation of the base station controller in one embodiment of the present invention.
Figure 11:
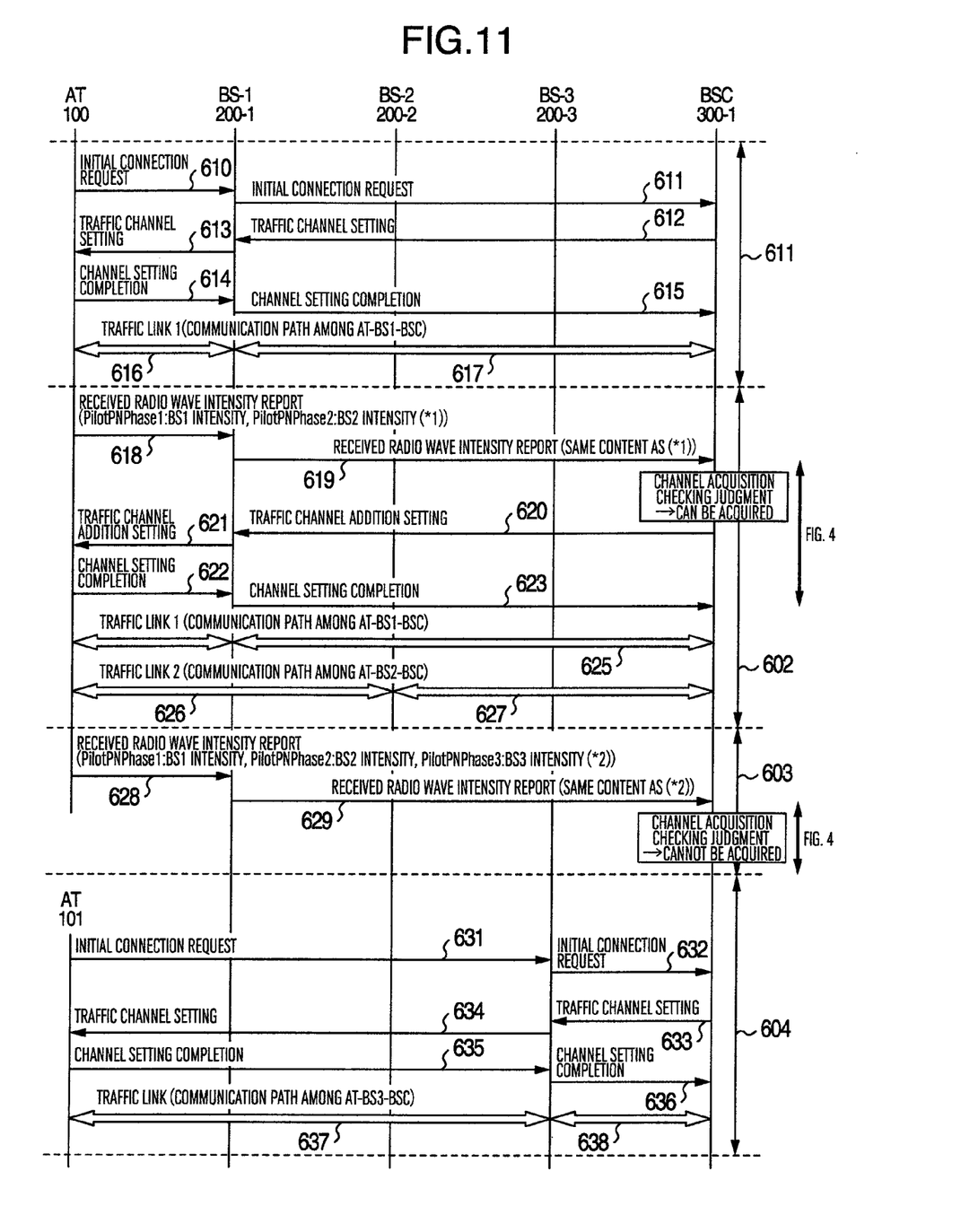
FIG. 11 is a sequence diagram showing the operation of the base station controller in one embodiment of the present invention.

Next, the following describes the operation of the base station controller based on FIG. 1 with reference to FIG. 4, FIG. 6, and FIG. 11.

FIG. 4 is a flowchart showing the operation of the base station controller when the measurement values of radio-wave intensities, received from the wireless base stations, are received from a wireless terminal.

FIG. 6 is a diagram showing the detailed operation flow of the processing, shown in FIG. 4, for judging whether a traffic channel can be acquired when a soft handoff occurs.

FIG. 11 is a sequence diagram showing the operation of a base station controller when a soft handoff occurs. This sequence diagram includes the following processes: the wireless terminal 100 is at the location A in the area 10-1 shown in FIG. 1 and the user performs the initial connection processing for starting sending and receiving traffic and, after that, the wireless terminal 100 moves to the location B and further to the location C.

The sequence of operations will be described below based on the sequence diagram in FIG. 11 while referencing the operation flows in FIG. 4 and FIG. 6 as necessary.

First, the following describes the operation in which the wireless terminal moves from the location A to the location B in FIG. 1.

(Initial connection at location A) The wireless terminal 100 at the location A in FIG. 1 sends an initial connection request (wireless communication path setting request) to the wireless base station 200-1 from which radio waves can be received and measured at the location A. The initial connection request is notified to the base station controller 300-1 that controls the wireless base station 200-1 (FIG. 11: 610, 611).

In response to the initial connection request, the base station controller 300-1 acquires a free traffic channel if there are traffic channel resources unused by the wireless base station 200-1 and notifies a traffic channel setting instruction, including the identifier of the traffic channel as the parameter, to the wireless terminal 100 via the wireless base station 200-1 (FIG. 11: 612, 613).

After the preparation for data sending and receiving, such as synchronization processing for the specified traffic channel, is completed, the wireless terminal 100 sends a channel setting completion notification to the base station controller 300-1 via the wireless base station 200-1. In this way, a traffic link 1 (wireless communication path) is established among the wireless terminal 100, wireless base station 200-1, and base station controller 300-1 (FIG. 11: 616, 617).

When the channel setting completion notification is received, the base station controller 300-1 saves information on the established communication path in a storage area in the memory called active set information. The active set information is information managed for each wireless terminal.

Figure 7:
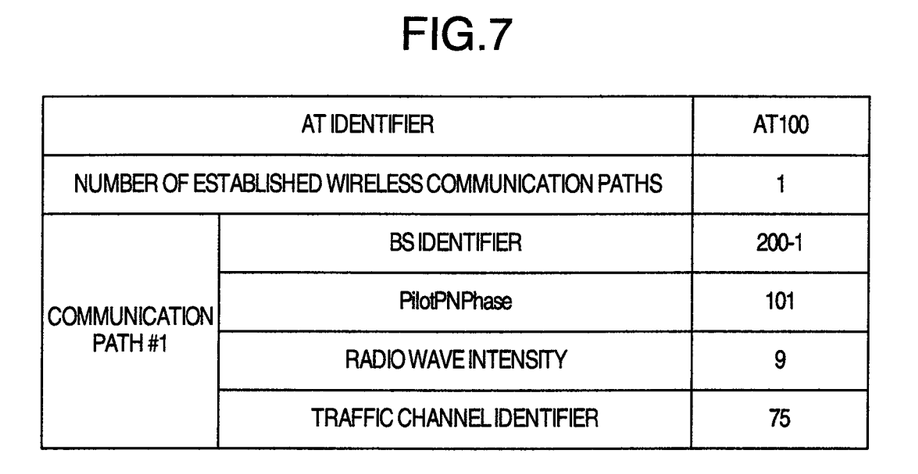
FIG. 7 is a diagram showing an example of the content of data on the wireless communication path status in the base station controller.

FIG. 7 is a diagram showing the configuration of active set information.

As shown in FIG. 7, the active set information includes the wireless terminal identifier, the number of established wireless communication paths, the identifier of the connected wireless base station on each communication path, the pilot PN phase values used by the wireless base stations, the received radio wave intensities of the wireless base stations notified by the wireless terminal, and the identifiers of the traffic channels that are used. A different pilot PN phase value is set for each wireless base station. When a wireless terminal notifies the received radio-wave intensity measurement results on a plurality of wireless base stations to the wireless base station in the subsequent steps, each measurement result is associated with the pilot PN phase and is notified to the wireless base station ("3GPP2C.S0024-A cdma2000 High Rate Packet Data Air Interface Specification Version 3.0 Chapter 8" p. 8-86, p. 8-132).

Next, the following describes the processing that is performed when the wireless terminal 100 moves from the location A to the location B.

(Location A→Location B) When the wireless terminal 100 moves from the location A to the location B, the radio wave received from the wireless base station 200-2 becomes strong enough to be measured. The wireless terminal 100 notifies the measurement results of the received radio wave intensities from the two wireless base stations, wireless base station 200-1 and wireless base station 200-2, to the base station controller 300-1 (FIG. 11: 618, 619). The base station controller 300-1 receives the measurement results of the received radio wave intensities of the two wireless base stations and checks the active set information. The base station controller detects that a new pilot PN phase, which is not found in the active set information, is included in the measurement results and judges that the received radio wave intensity of a new wireless base station is included in the measurement results (FIG. 4: S401). After that, the base station controller extracts a wireless base station, whose received radio wave intensity is highest, from the wireless base stations for which the communication path to the wireless terminal 100 has already been established (In this example, the base station controller extracts the received radio wave intensity of the wireless base station 200-1 because the wireless base station 200-1 is the only wireless base station for which the communication path has already been established).

Next, the base station controller calculates the ratio between the received radio wave intensity of the wireless base station for which the communication path has been already established with the wireless terminal 100 and which has the highest received radio wave intensity (in this example, wireless base station 200-1 because the wireless base station 200-1 is the only wireless base station for which the communication path has already been established) and the received radio wave intensity of the new wireless base station (wireless base station 200-2) according to the following expression.

$\phi$=(Received radio wave intensity of wireless base station 200-2)/(Received radio wave intensity of wireless base station 200-1)

Next, the base station controller 300-1 references the controlled-base-station information to judge if the newly received pilot PN phase indicates a base station controlled by this base station controller.

Figure 9:
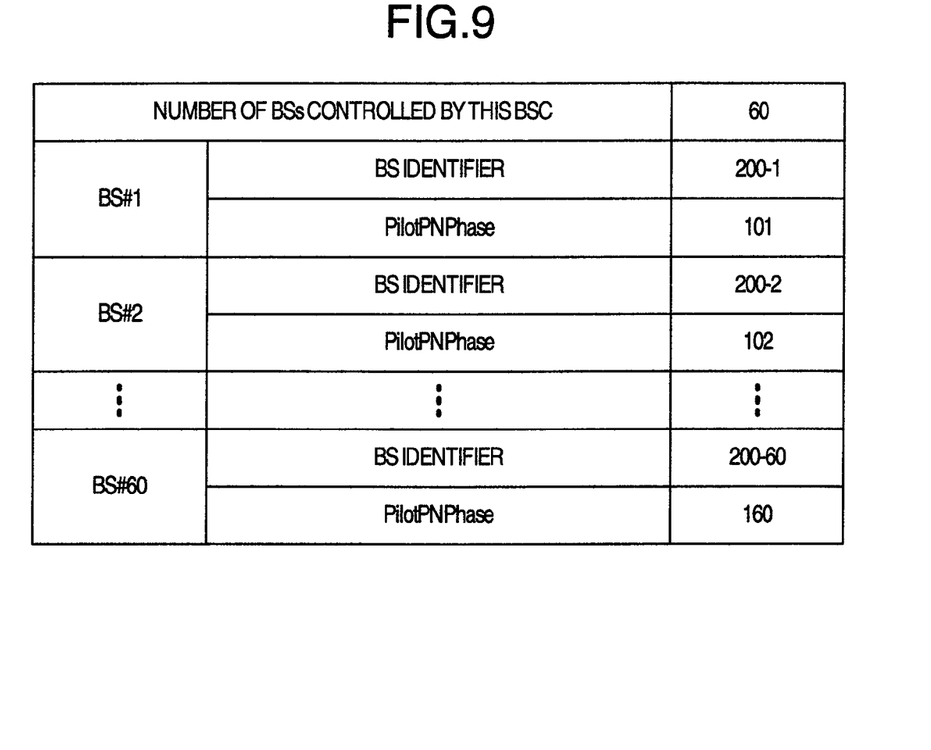
FIG. 9 is a diagram showing an example of the content of data on the wireless communication path status in the base station controller.

FIG. 9 is a diagram showing the configuration of the controlled-base-station information indicating the base stations controlled by the base station controller.

As shown in FIG. 9, the controlled-base-station information includes the number of base stations controlled by the base station controller and the base station identifier and the pilot PN phase number of each controlled base station.

If the newly received pilot PN phase is found in the controlled-base-station base station information on the base stations controlled by the base station controller, the base station controller judges that the new wireless base station (wireless base station 200-2) is a wireless base station controlled by the base station controller. For a base station that is controlled by this base station controller, the base station controller performs traffic channel acquisition checking processing in the base station controller. FIG. 6 is an operation flowchart showing the detailed traffic channel acquisition checking processing.

In the traffic channel acquisition checking processing, the base station controller first checks the traffic channel usage rate of the wireless base station 200-2 which a communication path to be added goes through. The traffic channel usage rate can be calculated as follows. The BS-basis traffic channel resource management unit 3513 of the base station controller manages the traffic channel resources of the wireless base stations controlled by the base station controller. The BS-basis traffic channel resource management unit 3513 manages information on each wireless base station, such as the total number of available channels, the usage status of each channel, and the total number of channels in use. The traffic channel usage rate is calculated by acquiring the total number of channels currently in use and the number of available channels from the BS-basis traffic channel resource management unit 3513 and by using the following expression. Traffic channel usage rate=(Total number of channels in use)/(Number of available channels).

The traffic channel usage rate is checked in two stages. First, a check is made if the traffic channel usage rate is lower than or higher than a predetermined primary threshold $\alpha$%. If the traffic channel usage rate is lower than the predetermined first threshold value $\alpha$%, it is judged that the traffic channel resources can be acquired. And, the base station controller acquires a free traffic channel (FIG. 6: S4061).

If the traffic channel usage rate is higher than the predetermined primary threshold value $\alpha$%, the traffic channel usage rate is further compared with a secondary threshold. If the traffic channel usage rate is lower than a predetermined secondary threshold value $\beta$%, it is judged that the traffic channel resources can be acquired only if the already-calculated radio wave intensity ratio $\phi$ is higher than a predetermined primary radio wave intensity ratio threshold value X (FIG. 6: S4062, S4063). Note that the primary threshold $\alpha$ and the secondary threshold value $\beta$ satisfy the relation $\alpha<\beta$. On the other hand, if the traffic channel usage rate is higher than the secondary threshold value $\beta$%, it is judged that the traffic channel resources can be acquired if the radio wave intensity ratio $\phi$ is higher than a predetermined secondary radio wave intensity ratio threshold value Y (FIG. 6: S4062, S4064). Note that the primary radio wave intensity ratio threshold value X and the secondary radio wave intensity ratio threshold Y satisfy the relation X<Y. This checking processing based on the radio wave intensity ratio achieves the effect that, when the traffic channel usage rate is higher, only the communication path addition processing that is more efficient and necessary for a wireless terminal to maintain the communication quality is performed. In this processing described above, two types of checking threshold, primary and secondary, are provided for the channel usage rate and the radio wave intensity ratio to enable the traffic channel consumption level and the soft handoff suppression level to be flexibly adjusted and set according to the area traffic condition of a base station. The values of α, β, X, and Y may be common in the whole wireless communication system or multiple patterns of the values may be prepared according to the characteristics of the areas in which base stations are installed. The combination of thresholds may also be changed according to the order in which the communication path to be connected is created for the wireless terminal.

In the sequence in FIG. 11, the result of the traffic channel acquisition checking processing shown in FIG. 6, which is performed based on the received radio wave intensities of the wireless base stations 200-1 and 200-2 received from the wireless terminal 100 that has moved to the location B, indicates that a traffic channel can be acquired. That is, in this case, though the traffic channel usage rate exceeds the secondary threshold value β, the radio wave intensity ratio φ is higher than the secondary threshold Y because the wireless terminal 100 is in an area where the radio wave intensity from the wireless base station 200-1 is almost equal to that from the wireless base station 200-2.

Figure 8:
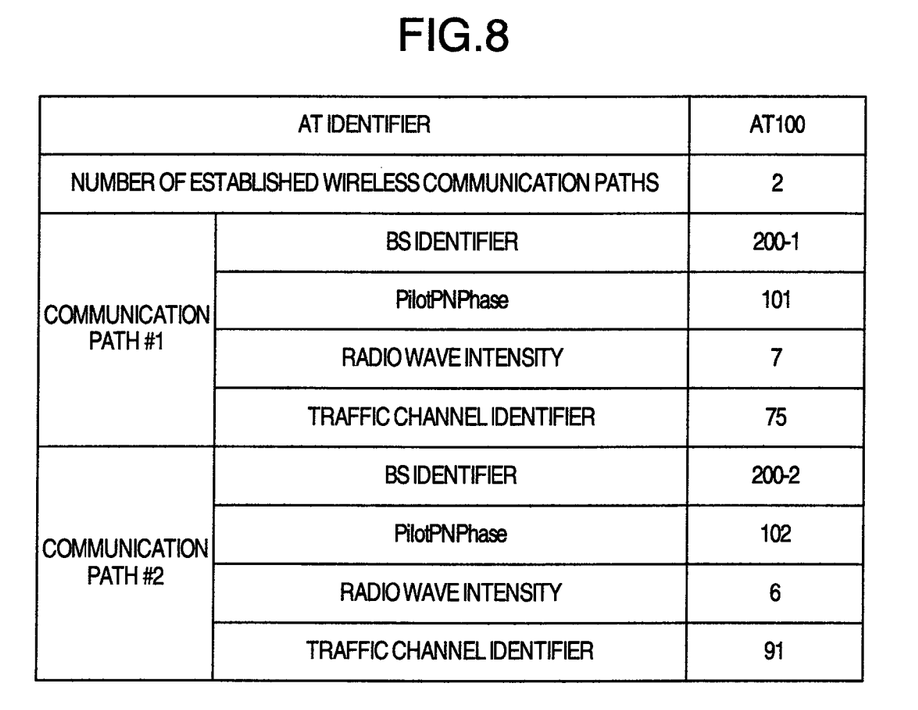
FIG. 8 is a diagram showing an example of the content of data on the wireless communication path status in the base station controller.

After the checking, the base station controller 300-1 notifies the traffic channel addition setting instruction, which includes the identifier of the acquired traffic channel as the parameter, to the wireless terminal 100 via the wireless base station 200-1 (FIG. 11: 620, 621). After the preparation for data sending and receiving, such as synchronization processing for the specified traffic channel, is completed, the wireless terminal 100 sends the channel setting completion notification to the base station controller 300 via the wireless base station 200-1. In this way, a traffic link 2 (wireless communication path) is established among the wireless terminal 100, wireless base station 200-2, and base station controller 300-1 (FIG. 11: 626, 627). In response to this channel setting completion notification, the base station controller 300-1 adds information on the additionally established wireless communication path to the active set information (FIG. 8).

Next, the following describes the operation in which the wireless terminal 100 moves from the location B to the location C.

(Location B→location C) When the wireless terminal 100 has moved to the location C, the received radio wave from the wireless base station 200-3 also becomes strong enough to be measured. The wireless terminal 100 notifies the measurement results of three received radio wave intensities of the wireless base stations 200-1, 200-2, and 200-3 to the base station controller 300-1 (FIG. 11: 628, 629). The base station controller 300-1 receives the measurement results, detects that a pilot PN phase not included in the last stored active set information is included, and judges that the received radio wave intensity of a new wireless base station is included in the measurement results (FIG. 4: S401). And, the base station controller 300-1 extracts the highest value of the received radio wave intensities from the wireless base stations that have already established communication paths with the wireless terminal 100. In the description below, it is assumed that the wireless base stations that have already established communication paths are wireless base station 200-1 and wireless base station 200-2 and that the received radio wave intensity of the wireless base station 200-1 is slightly higher than that of the wireless base station 200-2. The base station controller 300-1 calculates the ratio between the received radio wave intensity of the wireless base station 200-1, which has the highest received radio wave intensity among the wireless base stations that have already established communication paths with the wireless terminal 100, and the received radio wave intensity of the new wireless base station (wireless base station 200-3) according to the following expression (FIG. 4: S402).

φ=(Received radio wave intensity of wireless base station 200-3)/(Received radio wave intensity of wireless base station 200-1)

Next, the base station controller 300-1 references the controlled-base-station information to judge if the newly received pilot PN phase indicates a base station controlled by this base station controller. If the newly received pilot PN phase is included in the controlled-base-station information, it is judged that the new wireless base station (wireless base station 200-3) is a base station controlled by this base station controller (FIG. 4: S404). If the base station is controlled by this base station controller, the base station controller 300-1 performs the traffic channel acquisition checking processing, shown in FIG. 6, in this base station controller. In the sequence in FIG. 11, the result of the traffic channel acquisition checking processing indicates an exemplary case in which the traffic channel usage rate is higher than the secondary threshold value β and the radio wave intensity ratio φ is lower than the secondary threshold value Y because the wireless terminal 100 is almost at the boundary of the radio wave area of the wireless base station 200-3. In this case, it is judged that a traffic channel cannot be acquired.

Next, the following describes the operation in which a wireless terminal 101, which is different from the wireless terminal 100, sends an initial connection request (wireless communication path setting request) to the wireless base station 200-3.

(Initial connection request from another wireless terminal) A sequence section 604 in FIG. 11 shows the sequence operation in which the wireless terminal 101, which is in the radio wave area of the wireless base station 200-3 (area 10-3 in FIG. 1) and is different from the wireless terminal 100, sends an initial connection request (wireless communication path setting request) to the wireless base station 200-3 to start sending and receiving user traffic. The initial connection request is notified to the base station controller 300-1 that controls the wireless base station 200-3 (FIG. 11: 631, 632). If there is an unused traffic channel resource in the wireless base station 200-3, the base station controller 300-1 acquires the traffic channel in response to the initial connection request to continue the processing for the initial connection request. In this case, if the traffic channel consumption is suppressed according to the traffic channel usage rate in accordance with the present invention described above, it is possible to prevent the traffic channel resources from being exhausted due to a soft handoff.

More specifically, the processing flow in the example in FIG. 11 achieves a traffic channel consumption suppression effect, prevents the traffic channel resources from being exhausted, and successfully acquires an unused traffic channel. The base station controller 300-1 sends the traffic channel setting instruction, which includes the identifier of a traffic channel as the parameter, to the wireless base station 200-3. When this instruction is received, a traffic link 1 (FIG. 11: 637, 638) is established among the wireless terminal 101, wireless base station 200-3, and base station controller 300.

The embodiment has been described in which whether or not a communication path can be established is judged based on the usage ratio of traffic channels and the received radio wave intensities of the base stations. The following gives the reason for using those factors as the judgment criterion as well as a supplementary description.

A wireless terminal notifies the measurement results of all wireless base stations, whose received radio wave intensities can be measured, to a base station controller. So, there is sometimes a great difference between the received radio wave intensity of a wireless base station that has already established a wireless communication path and the received radio wave intensity of a new wireless base station whose radio wave becomes strong enough to be measured. In this case, immediately establishing a wireless communication path between the new wireless base station, whose measurement result is notified, and the wireless terminal does not lead to an increase in the communication performance of the wireless communication path. This trend is more obvious when the wireless terminal has many established wireless communication paths at the same time.

Considering this fact, the base station controller judges the usage rate of traffic channels of the wireless base station after the measurement result of the received radio wave intensity of the additional wireless base station is reported from the wireless terminal to the base station controller and before the base station controller reserves and acquires a free traffic channel in the corresponding wireless base station. Next, if the usage rate is equal to or higher than the predetermined threshold, the base station controller calculates the ratio between the highest received radio wave intensity of the wireless base stations that have already established wireless communication paths with the wireless terminal and the received radio wave intensity of the additional wireless base station. If the calculated radio wave intensity ratio is equal to or higher than the predetermined threshold, the base station controller continues the free traffic channel acquisition processing and the wireless communication path addition processing. If the calculated ratio is equal to or lower than the predetermined threshold, the base station controller suspends the wireless communication path addition processing.

Alternatively, if the traffic channel usage rate is equal to or higher than the predetermined threshold, it is possible for the base station controller to calculate the difference, instead of the received radio wave intensity ratio, between the highest received radio wave intensity of the wireless base stations that have already established wireless communication paths with the wireless terminal and the received radio wave intensity of the additional wireless base station. In this case, only if the difference in the received radio wave intensities is smaller than the predetermined threshold, the base station controller continues the free traffic channel acquisition processing and the wireless communication path addition processing and, if the difference is equal to or higher than the predetermined threshold, suspends the wireless communication path addition processing. If, after the wireless communication path addition processing is suspended, the wireless terminal continues moving around and the measurement result of the received radio wave intensity of the additional wireless base station described above is updated and notified and, in addition, the ratio between the highest received radio wave intensity of the wireless base stations that have already established communication paths with the wireless terminal and the updated value of the received radio wave intensity of the additional wireless base station becomes equal to or higher than the predetermined threshold, the base station controller continues the wireless communication path addition processing.

If the wireless terminal does not move in the direction in which the received radio wave intensity of the additional wireless base station increases, the traffic channels of the wireless base station remain unconsumed.

More specifically, when the base station controller receives the wireless terminal's measurement results of the received radio wave intensities of all wireless base stations, including the received radio wave intensity of the additional wireless base station, via a wireless base station in a wireless communication system, the base station controller extracts the highest received radio wave intensity value from the received radio wave intensities of the wireless base stations that have already established wireless communication paths, calculates the ratio between the highest received radio wave intensity and the received radio wave intensity of the additional wireless base station, creates a traffic channel acquisition request message that includes the radio wave intensity ratio as the parameter, and sends the created message to a base station controller that manages the connection of the wireless base station. The base station controller that manages the connection of the wireless base station is either another base station controller or the base station controller that has sent the traffic channel acquisition request message. In addition, the base station controller that receives the traffic channel acquisition request message collects the current traffic channel usage rate of the wireless base station and, if the collected usage rate is higher than the predetermined threshold, performs the free traffic channel acquisition processing next only if the notified radio wave intensity ratio is equal to or higher than the predetermined threshold.

[Second Embodiment]

Figure 5:
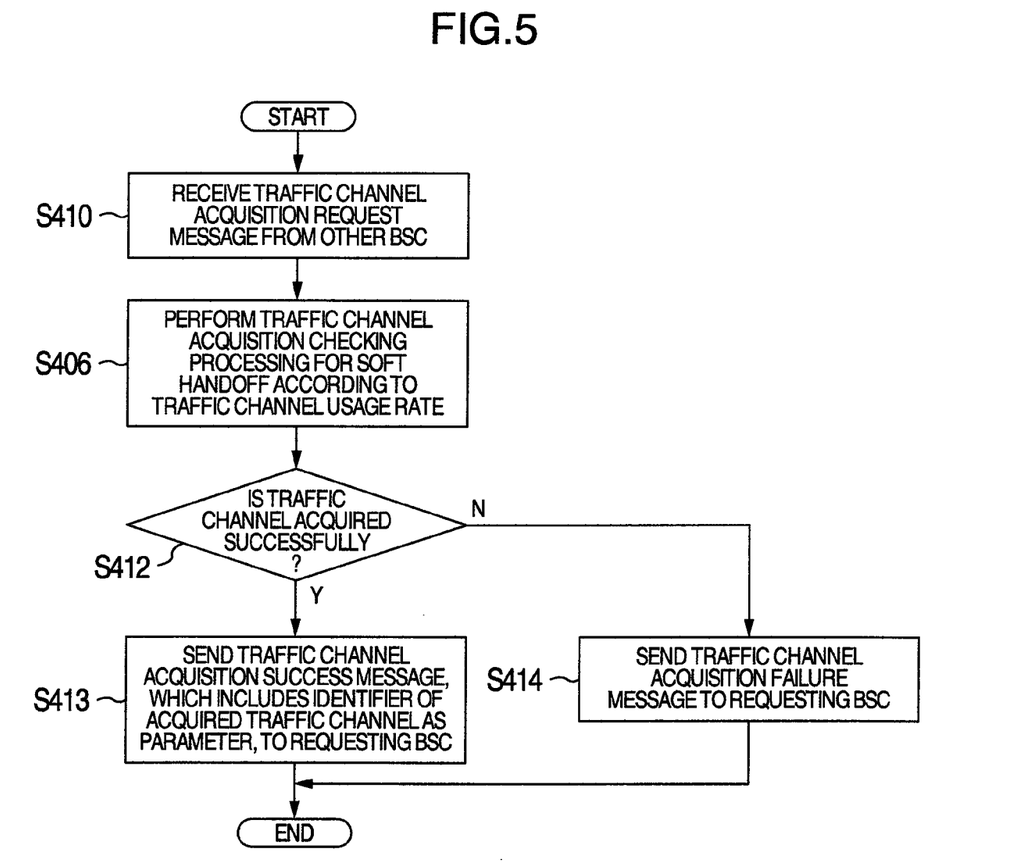
FIG. 5 is a flowchart showing the operation of the base station controller in one embodiment of the present invention.
Figure 12:
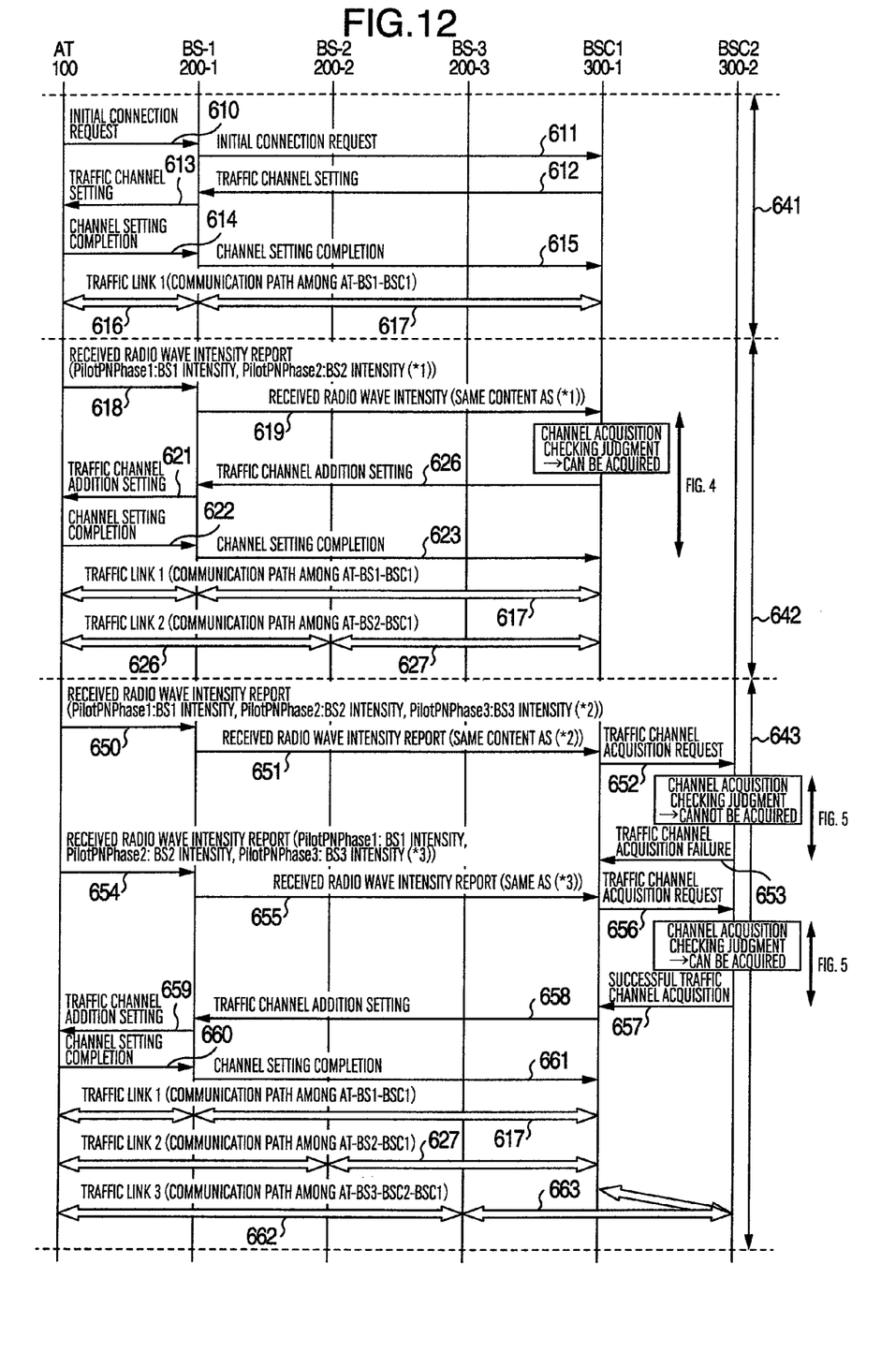
FIG. 12 is a sequence diagram showing the operation of the base station controller in one embodiment of the present invention.

Next, referring to FIG. 5, FIG. 6, and FIG. 12, the following describes an embodiment in which a wireless base station, via which a communication path is added, is connected to a base station controller different from a base station controller that has received the measurement value of the received radio wave intensity.

FIG. 5 is a flowchart showing the operation of a base station controller to which a wireless base station, via which a communication path is added, is connected when the wireless base station, via which a communication path is added, is connected to a base station controller different from the base station controller that has received the measurement value of the received radio wave intensity.

FIG. 6 is a diagram showing the detailed operation flow of the processing, shown in FIG. 4, for judging whether a traffic channel can be acquired when a soft handoff occurs.

FIG. 12 is a diagram showing an example of the operation sequence when the wireless base station 200-3 in FIG. 1 is connected to another base station controller (not shown). Sequence sections 641 and 642 in FIG. 12 show the operation sequence in which the wireless terminal 100 sends an initial connection request at the location A and, after that, moves to the location B in the same way as in the sequence sections 601 and 602 in FIG. 11, and the processing content of those sequence sections are the same as those in the sequence sections 601 and 602 in FIG. 11.

The operation will be described below based on FIG. 12 with reference to the operation flows in FIG. 5 and FIG. 6 as necessary. The following describes the operation sequence in the sequence section 643 in FIG. 12.

(Location B→location C) When the wireless terminal 100 moves to the location C and the received radio wave of the wireless base station 200-3 becomes strong enough to be measured, the wireless terminal 100 notifies the measurement results of three received radio wave intensities of the wireless base stations 200-1, 200-2, and 200-3 to the base station controller 300-1 (FIG. 12: 650, 651). Because the measurement results including a pilot PN phase not included in the active set information are received, the base station controller 300-1 judges that the received radio wave intensity of a new wireless base station is included in the measurement results (FIG. 4: S401). And, the base station controller 300-1 extracts the highest value of the received radio wave intensities from the wireless base stations that have already established communication paths with the wireless terminal 100. In the description below, it is assumed that the received radio wave intensity of the wireless base station 200-1 is slightly higher than that of the wireless base station 200-2. The base station controller 300-1 calculates the ratio between the received radio wave intensity of the wireless base station 200-1, which has the highest received radio wave intensity among the wireless base stations that have already established communication paths with the wireless terminal 100, and the received radio wave intensity of the new wireless base station (wireless base station 200-3) according to the following expression (FIG. 4: S402).

$$\phi=\text{(Received radio wave intensity of wireless base station 200-3)/(Received radio wave intensity of wireless base station 200-1)}$$

Next, the base station controller 300-1 references the controlled-base-station information, stored in itself, to judge if the newly received pilot PN phase is included in the controlled-base-station information of this base station controller. The base station controller further has neighboring base station information. If the newly received PN phase is not included in the controlled-base-station information of this base station controller, the base station controller checks the neighboring base station information.

Figure 10:
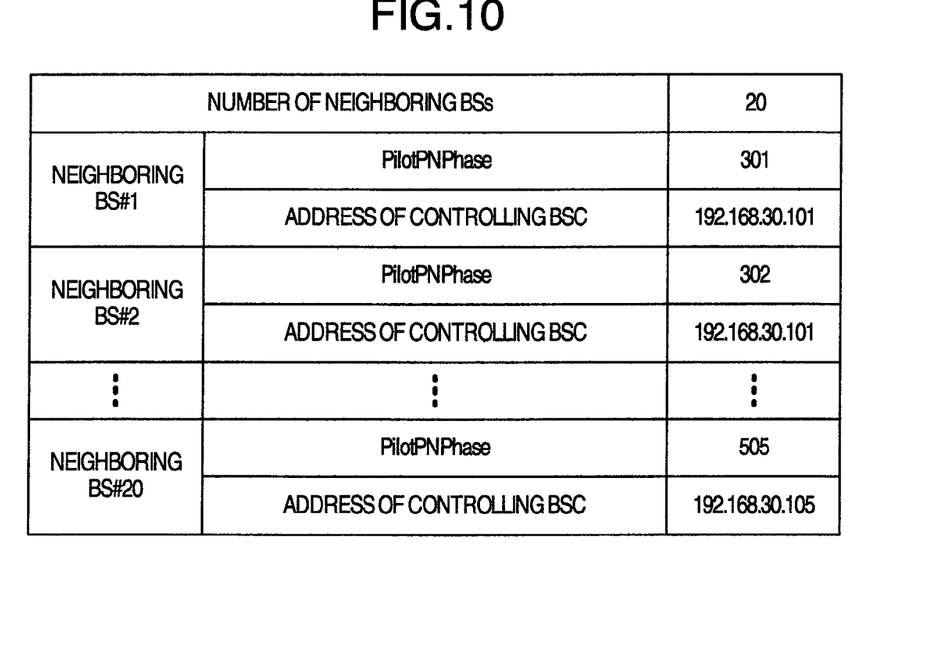
FIG. 10 is a diagram showing an example of the content of data on the wireless communication path status in the base station controller.

FIG. 10 is a configuration diagram of the neighboring base station information.

If the newly received pilot PN phase is included in the neighboring base station information, it is judged that the new wireless base station (wireless base station 200-3) is a wireless base station controlled by another base station controller (FIG. 4: S403). And, the base station controller creates a traffic channel acquisition request message that includes the calculated radio wave intensity ratio ($\phi$) as the parameter (FIG. 4: S404). The base station controller sends the created message to a base station controller 300-2 that controls the wireless base station 200-3 (FIG. 12: 652). When the traffic channel acquisition request message is received from the other base station controller, the base station controller 300-2 performs the traffic channel acquisition checking processing shown in FIG. 6 (FIG. 5: S410, S406). A sequence 653 in FIG. 12 shows a case in which the radio wave intensity ratio $\phi$ is lower than the primary threshold X because the traffic channel usage rate is higher than the primary threshold $\alpha$ and the wireless terminal 100 is almost at the boundary of the radio wave area of the wireless base station 200-3. So, judging that a traffic channel cannot be acquired, the base station controller 300-2 creates a traffic channel acquisition failure message and sends the created message to the base station controller 300-1 (FIG. 5: S414).

Next, the following describes a case in which the wireless terminal 100 moves from the location C to a location nearer to the center of the area 10-3.

(Movement from location C to a location near to the center of overlapped area) The wireless terminal 100 moves from the location C to a location nearer to the center of the area 10-3, and the latest measurement results of the three received radio wave intensities of the wireless base stations 200-1, 200-2, and 200-3 are notified from the wireless terminal 100 to the base station controller 300-1 (FIG. 12: 654, 655). Similarly, the base station controller 300-1, which has received the measurement values of the received radio wave intensities, detects that the received radio wave intensity of the wireless base station 200-3 is the received radio wave intensity of a new wireless base station (wireless base station for which a communication path is not yet established) (FIG. 4: S401) and calculates the received radio wave intensity ratio ($\phi$). The base station controller 300-1 creates a traffic channel acquisition request message (FIG. 4: S404) and sends the created message to the base station controller 300-2 (FIG. 12: 656). The result of the traffic channel acquisition checking processing in the base station controller 300-2 indicates that the traffic channel usage rate is higher than the primary threshold a but the radio wave intensity ratio $\phi$ is higher than the primary threshold X. In this case, it is judged that a traffic channel can be acquired. The base station controller 300-2 creates a traffic channel acquisition success message, which includes the identifier of the acquired traffic channel as the parameter, and sends the created message to the base station controller 300-1 (FIG. 5: S413, FIG. 12: 657).

When this traffic channel acquisition success message is received, the base station controller 300-1 notifies a traffic channel addition setting instruction, which includes the identifier of the traffic channel as the parameter, to the wireless terminal 100 via the wireless base station 200-1 (FIG. 12: 658, 659). After the preparation for data sending and receiving, such as synchronization processing for the specified traffic channel, is completed, the wireless terminal 100 sends a channel setting completion notification to the base station controller 300-1 via the wireless base station 200-1. In this way, a traffic link 3 (wireless communication path) is established among the wireless terminal 100, wireless base station 200-3, base station controller 300-2, and base station controller 300-1 (FIG. 12: 662, 663).

In the examples of the embodiments described above, it is assumed that a wireless terminal moves around with a communication path already connected to one of wireless base stations. The following describes an example of processing that is performed immediately after the power of a wireless terminal is turned on.

First, consider an example in which a wireless terminal is designed in such a way that, immediately after the power is turned on, a connection request is sent to establish a communication path with a wireless base station of the highest radio wave intensity. If, after the power of a wireless terminal is turned on and a communication path is connected to a wireless base station of the highest radio wave intensity, a radio wave is received from another wireless base station, the wireless terminal notifies the measurement results of all wireless base stations, whose received radio wave intensities can be measured, to the base station controller. The subsequent flow is the same as that shown in FIG. 4 to FIG. 6.

On the other hand, if a wireless terminal is designed in such a way that, immediately after the power is turned on, a connection request is sent to a plurality of wireless base stations whose received radio waves can be measured, the base station controller references the wireless terminal's measurement results of all wireless base stations whose received radio wave intensities can be measured and sets up a communication path with one of the wireless base stations that has the highest reception intensity. The subsequent flow is the same as that shown in FIG. 4 to FIG. 6.

Although FIG. 1 shows an example of an omnicell configuration in which one base station covers one area, the same flow can be applied also to a sector configuration, in which one base station has multiple divided areas, by performing the processing on a sector basis rather than on a wireless base station basis. In the sector configuration, a BS identifier identifying a wireless base station, as well as a sector identifier identifying the sector of each base station, is used in FIG. 7 to FIG. 9. The same flow can be applied to the sector configuration by identifying each sector using the BS identifier and the sector identifier and by replacing 'BS' with 'sector of BS' in the flows in FIG. 4 to FIG. 6.

The system in the embodiments of the present invention described above provides the wireless terminal user with services of uniform connection quality even when a sudden increase occurs in the wireless terminal traffic that was unexpected at the design time of the wireless base station facilities or even when traffic congestion is caused by the geographical radio wave environment.

In the conventional handoff, a wireless communication path is added unconditionally when the received radio wave intensity can be measured. This results in an ineffective usage of wireless resources. The wireless communication system of the present invention solves this problem.

The present invention provides a wireless communication system that allows the facilities to be designed at wireless base station installation time so that, with consideration for the cell boundaries, landforms, and traffic amounts, the average number of traffic channels consumed simultaneously by wireless terminals falls in a desired range when a soft handoff occurs.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A wireless communication system comprising:
   a plurality of base stations that wirelessly communicate with a plurality of wireless terminals; and
   a base station controller that controls the plurality of base stations wherein:
   said base station controller comprises a soft handoff execution control unit and a base station information management unit that manages information on the controlled base stations,
   when a measurement value of a received radio wave intensity of a base station, which has not yet established a communication path with a wireless terminal in a soft handoff status, is received from said wireless terminal, said soft handoff execution control unit references said base station information management unit, calculates a ratio between the received measurement value of the received radio wave intensity and a measurement value of a highest received radio wave intensity of base stations that have already established communication paths with said wireless terminal and, based on the calculated ratio and a traffic channel usage rate of the base station with which said wireless terminal has not yet established a communication path, judges if a communication path can be established between said wireless terminal and said base station, and
   two levels of judgment criterion thresholds, a first threshold and a second threshold, are set for the traffic channel usage rate of the base station and two types of judgment criterion values, a first criterion value and a second criterion value, are set for the radio wave intensity ratio and it is judged that a communication path can be established if the traffic channel usage rate is lower than the first threshold, if the traffic channel usage rate is equal to or higher than the first threshold and is equal to or lower than the second threshold and the radio wave intensity ratio is higher than the first criterion value, or if the traffic channel usage rate is higher than the second threshold and the radio wave intensity ratio is higher than the second criterion value.

2. The wireless communication system according to claim 1 wherein there are multiple types of the first and second thresholds and the first and second criterion values in said wireless communication system.

3. The wireless communication system according to claim 2 wherein the first and second thresholds and the first and second criterion values are decided according to a number of communication paths already established by said wireless terminal.

4. A wireless communication system comprising:
   a plurality of base stations that wirelessly communicate with a plurality of wireless terminals; and
   a plurality of base station controllers each of which controls the plurality of base stations wherein:
   each of said base station controllers comprises a soft handoff execution control unit and a base station information management unit that manages information on the controlled base stations,
   when a measurement value of a received radio wave intensity of a base station, which is a base station controlled by another base station controller and which has not yet established a communication path with a wireless terminal in a soft handoff status, is received from said wireless terminal, said soft handoff execution control unit references said base station information management unit, calculates a ratio between the received measurement value of the received radio wave intensity and a measurement value of a highest received radio wave intensity of base stations that have already established communication paths with said wireless terminal, creates a message that includes the calculated ratio as a parameter, and sends the created message to the base station controller that controls said base station,
   the base station controller that receives the message judges if a communication path can be established between said wireless terminal and said base station based on a traffic channel usage rate of the base station with which said wireless terminal has not yet established a communication path, and
   two levels of judgment criterion thresholds, a first threshold and a second threshold, are set for the traffic channel usage rate of the base station and two types of judgment criterion values, a first criterion value and a second criterion value, are set for the radio wave intensity ratio and it is judged that a communication path can be established if the traffic channel usage rate is lower than the first threshold, if the traffic channel usage rate is equal to or higher than the first threshold and is equal to or lower than the second threshold and the radio wave intensity ratio is higher than the first criterion value, or if the traffic channel usage rate is higher than the second threshold and the radio wave intensity ratio is higher than the second criterion value.

5. The wireless communication system according to claim 4 wherein there are multiple types of the first and second thresholds and the first and second criterion values in said wireless communication system.

6. The wireless communication system according to claim 5 wherein the first and second thresholds and the first and second criterion values are decided according to a number of communication paths already established by said wireless terminal.

7. A soft handoff control method for use in a wireless communication system comprising a plurality of base stations that wirelessly communicate with a plurality of wireless terminals; and a base station controller that controls the plurality of base stations, the method comprising:

when a measurement value of a received radio wave intensity of a base station, which has not yet established a communication path with a wireless terminal in a soft handoff status, is received from said wireless terminal: calculating, by way of said base station controller, a ratio between the received measurement value of the received radio wave intensity and a measurement value of a highest received radio wave intensity of base stations that have already established communication paths with said wireless terminal; and judging, based on the calculated ratio and a traffic channel usage rate of the base station with which said wireless terminal has not yet established a communication path, if a communication path can be established between said wireless terminal and said base station, wherein two levels of judgment criterion thresholds, a first threshold and a second threshold, are set for the traffic channel usage rate of the base station and two types of judgment criterion values, a first criterion value and a second criterion value, are set for the radio wave intensity ratio and it is judged that a communication path can be established if the traffic channel usage rate is lower than the first threshold, if the traffic channel usage rate is equal to or higher than the first threshold and is equal to or lower than the second threshold and the radio wave intensity ratio is higher than the first criterion value, or if the traffic channel usage rate is higher than the second threshold and the radio wave intensity ratio is higher than the second criterion value.

8. The soft handoff control method according to claim 7 wherein there are multiple types of the first and second thresholds and the first and second criterion values in said wireless communication system.

9. The soft handoff control method according to claim 8 wherein the first and second thresholds and the first and second criterion values are decided according to a number of communication paths already established by said wireless terminal.

10. A soft handoff control method for use in a wireless communication system comprising a plurality of base stations that wirelessly communicate with a plurality of wireless terminals; and a plurality of base station controllers each of which controls the plurality of base stations, the method comprising:

when a measurement value of a received radio wave intensity of a base station, which is a base station controlled by another base station controller and which has not yet established a communication path with a wireless terminal in a soft handoff status, is received from said wireless terminal: calculating, by way of said base station controller, a ratio between the received measurement value of the received radio wave intensity and a measurement value of a highest received radio wave intensity of base stations that have already established communication paths with said wireless terminal; creating a message that includes the calculated ratio as a parameter; sending the created message to the base station controller that controls said base station; and judging, by the base station controller that receives the message, if a communication path can be established between said wireless terminal and said base station based on a traffic channel usage rate of the base station with which said wireless terminal has not yet established a communication path, wherein two levels of judgment criterion thresholds, a first threshold and a second threshold, are set for the traffic channel usage rate of the base station and two types of judgment criterion values, a first criterion value and a second criterion value, are set for the radio wave intensity ratio and it is judged that a communication path can be established if the traffic channel usage rate is lower than the first threshold, if the traffic channel usage rate is equal to or higher than the first threshold and is equal to or lower than the second threshold and the radio wave intensity ratio is higher than the first criterion value, or if the traffic channel usage rate is higher than the second threshold and the radio wave intensity ratio is higher than the second criterion value.

11. The soft handoff control method according to claim 10 wherein there are multiple types of the first and second thresholds and the first and second criterion values in said wireless communication system.

12. The soft handoff control method according to claim 11 wherein the first and second thresholds and the first and second criterion values are decided according to a number of communication paths already established by said wireless terminal.

* * * * *